United States Patent
Kamthe et al.

(10) Patent No.: US 12,096,206 B2
(45) Date of Patent: *Sep. 17, 2024

(54) CUSTOMIZED CODE BUNDLE TO ENABLE SECURE COMMUNICATION FROM INTERNET OF THINGS DEVICES AT WIRELESS NETWORKS

(71) Applicant: Hewlett Packard Enterprise Development LP, Spring, TX (US)

(72) Inventors: Ankur Kamthe, Santa Clara, CA (US); Jian Dong, Santa Clara, CA (US); Berend Dunsbergen, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,125

(22) Filed: Oct. 30, 2023

(65) Prior Publication Data

US 2024/0064506 A1 Feb. 22, 2024

Related U.S. Application Data

(63) Continuation of application No. 17/170,707, filed on Feb. 8, 2021, now Pat. No. 11,825,299.

(51) Int. Cl.
*H04L 29/06* (2006.01)
*G06N 20/00* (2019.01)
(Continued)

(52) U.S. Cl.
CPC .......... *H04W 12/009* (2019.01); *G06N 20/00* (2019.01); *G16Y 30/10* (2020.01); *G16Y 40/35* (2020.01); *H04L 43/065* (2013.01); *H04L 43/0811* (2013.01); *H04L 43/10* (2013.01); *H04L 63/123* (2013.01)

(58) Field of Classification Search
CPC ............... H04W 12/009; H04W 12/35; H04W 12/50; H04W 88/08; H04W 12/122; G06N 20/00; G06N 5/01; G16Y 30/10; G16Y 40/35; H04L 43/065; H04L 43/0811; H04L 43/10; H04L 63/123; H04L 41/0846; H04L 41/0853
See application file for complete search history.

(56) References Cited

U.S. PATENT DOCUMENTS 8,589,866 B2 11/2013 Sekine et al.
10,678,975 B2 6/2020 Young et al.
(Continued)

OTHER PUBLICATIONS

Chen, D., et al., "System Synthesis and Automated Verification: Design Demands for IoT Devices," Mar. 2016, 8 pages, https://vast.cs.ucla.edu/sites/default/files/publications/SCAW16-SysSynthesis.pdf.

(Continued)

*Primary Examiner* — Mahfuzur Rahman
(74) *Attorney, Agent, or Firm* — Dickinson Wright

(57) ABSTRACT

Systems and methods are provided for receiving, from an access point, attributes of an Internet of Things (IoT) device connected to the access point, determining a stored device, in a database of a server, sharing a subset of the attributes of the IoT device, and generating a code bundle based on the subset of the shared attributes between the stored device and the IoT device.

16 Claims, 9 Drawing Sheets

(51) Int. Cl.
*G16Y 30/10* (2020.01)
*G16Y 40/35* (2020.01)
*H04L 9/40* (2022.01)
*H04L 43/065* (2022.01)
*H04L 43/0811* (2022.01)
*H04L 43/10* (2022.01)
*H04W 12/00* (2021.01)

(56) References Cited

U.S. PATENT DOCUMENTS

| | | | |
|---|---|---|---|
| 10,694,557 B2 | 6/2020 | Gupta et al. | |
| 2018/0300364 A1* | 10/2018 | Xu | G06Q 50/00 |
| 2019/0116087 A1 | 4/2019 | Hiller | |
| 2019/0149365 A1 | 5/2019 | Chatterjee et al. | |
| 2019/0159136 A1 | 5/2019 | Molavianjazi et al. | |
| 2019/0356420 A1* | 11/2019 | John Wilson | H04B 7/0408 |
| 2020/0045767 A1 | 2/2020 | Velev et al. | |
| 2020/0173808 A1* | 6/2020 | Beaurepaire | G06Q 50/40 |
| 2020/0314960 A1 | 10/2020 | Basu et al. | |
| 2021/0182996 A1 | 6/2021 | Cella et al. | |
| 2021/0303270 A1* | 9/2021 | Liu | G06F 8/30 |
| 2021/0342836 A1 | 11/2021 | Cella et al. | |
| 2023/0136240 A1 | 5/2023 | Zhu et al. | |
| 2023/0403123 A1* | 12/2023 | Wu | H04L 5/0094 |
| 2023/0421310 A1* | 12/2023 | Ying | H04W 72/51 |

OTHER PUBLICATIONS

Edelmann, A., "IoT Device Abstraction with Eclipse Vorto," Web site, 2017, accessed Nov. 9, 2020, https://www.eclipse.org/community/eclipse_newsletter/2017/march/article1.php#:-:text=Eclipse%20Vorto.

* cited by examiner

CUSTOMIZED CODE BUNDLE TO ENABLE SECURE COMMUNICATION FROM INTERNET OF THINGS DEVICES AT WIRELESS NETWORKS

CROSS-REFERENCE TO RELATED APPLICATIONS

This application is a continuation application of and claims priority to U.S. application Ser. No. 17/170,707, filed on Feb. 8, 2021, the contents of which are hereby incorporated by reference in their entireties.

BACKGROUND

The proliferation of Internet of Things (IoT) devices has brought on an increasing requirement for secure access of these IoT devices to wireless networks. Currently, performance and functionality of the IoT devices is sometimes compromised due to security issues and latency while attempting to access wireless networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
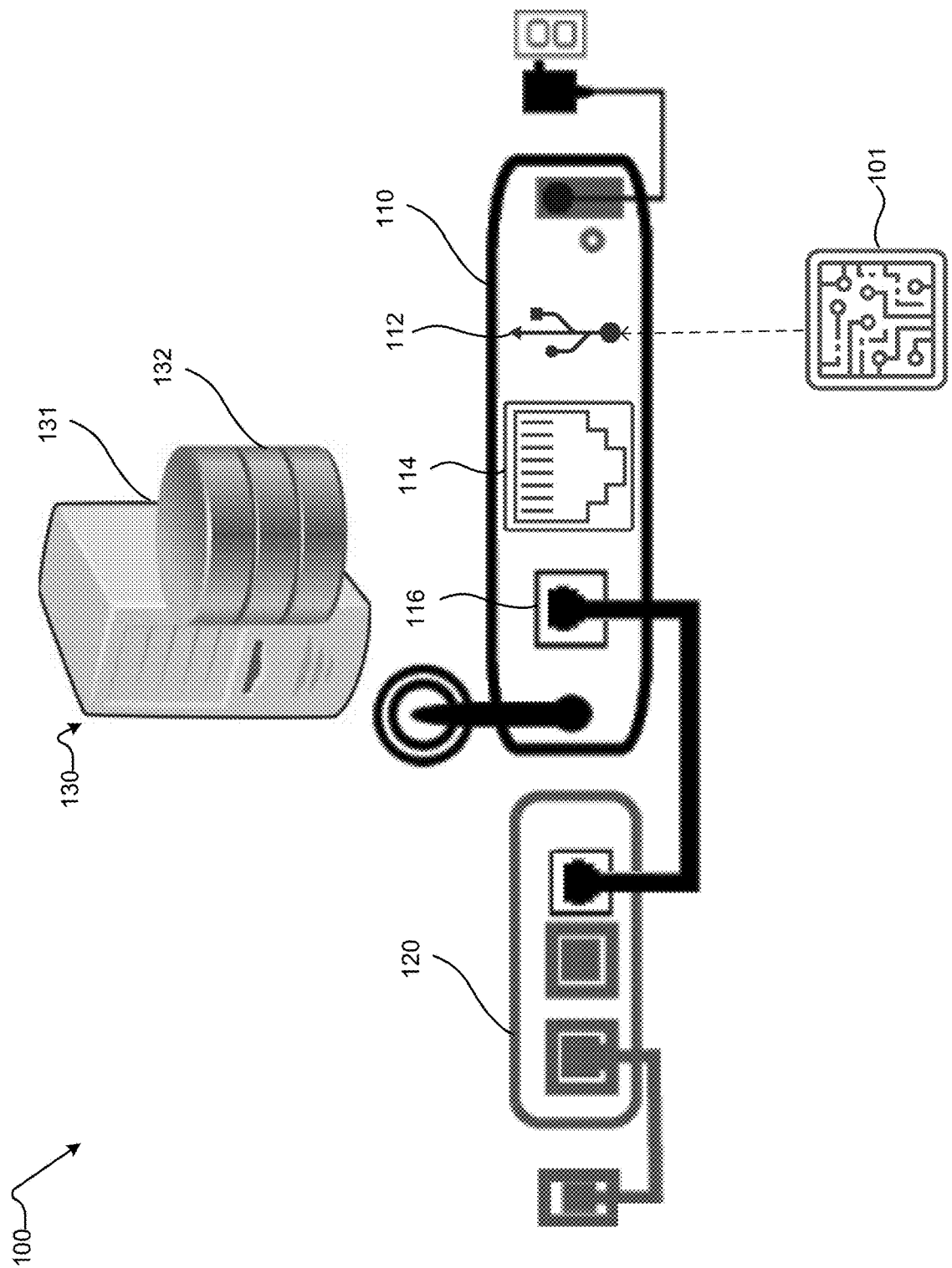
FIG. 1A is an exemplary illustration of a computing system that generates a code bundle, according to embodiments described in the present disclosure.

The figures are not exhaustive and do not limit the present disclosure to the precise form disclosed.

DETAILED DESCRIPTION

The development of a cornucopia of IoT devices has spurred a need to develop secure and reliable network access to the wide range of IoT devices. Such network access is essential to the performance and functionality of IoT devices. Access points that are used to provide network access to IoT devices need to be versatile to accommodate the different wireless protocols that the IoT devices operate on, including, WiFi (Wireless Fidelity), BLE (Bluetooth Low Energy), and IEEE (Institute of Electrical and Electronics Engineers) 802.15.4 protocols such as Zigbee (Zonal Intercommunication Global-standard, where Battery life is long, which is Economical to deploy, and which exhibits Efficient use of resources), ISA100.11a (Internet Society of Automation 100.11a), WirelessHART (Highway Addressable Remote Transducer Protocol), MiWi (Microchip Wireless), 6LoWPAN (IPv6 over Low-Power Wireless Personal Area Networks), Thread, and SNAP (Subnetwork Access Protocol).

Problems with current approaches of providing wireless access to IoT devices are twofold. In these current approaches, information of each of the different protocols to provide wireless access to the different IoT devices, may be stored as an image or footprint at an access point. A first problem in these approaches is that they entail large storage requirements at an access point, resulting from an increased image or footprint size.

Another problem caused by these approaches of storing protocol information at an access point is the difficulty in debugging or updating of protocols. Because the protocol information is integrated into an operating system of the access point, and the operating system of the access point can only be updated at scheduled cycles, necessary updates may not be carried out until a next release cycle of the operating system. Thus, not only is out-of-data protocol information stuck at the access points, but the IoT devices that may require updates to access a network, may be prevented from doing so.

Embodiments described herein address these technical problems by generating customized code bundles to be installed at the access point to establish secure and reliable network access to devices connected to the access point, and by offloading the generation of code bundles from the access point to a remote server. As a result, the access point has a reduced image size and reduced code bloat, and is able to maintain its performance. At the same time, customized code bundles are updated on the fly when necessary, for example, to debug or update. In an event of a mismatch or misconfiguration between an access point and associated firmware, embodiments as described herein identify the problem and automatically resolve it by updating code or parameters with minimal manual effort. The customized code bundles, when validated, result in the devices being compatible and successfully integrated with the access point, in particular, the operating system of the access point. Being successfully integrated means that a device has access to a wireless network associated with the access point, while successfully receiving and transmitting data at the access point, such that any data packets transmitted from that device are decipherable in a particular format, for example, JSON (JavaScript Object Notation) or ASCII (American Standard Code for Information Interchange). The customed code bundles include instructions and/or protocol that are required for a device to receive and transmit properly formatted and decipherable data at the access point.

In some embodiments, as will be described with respect to the FIGS. below, the remote server may generate a customized code bundle for an IoT device based on previously used code bundles used for other IoT devices having a subset of attributes in common with the IoT device, one or more inputs or feedbacks from one or more users, and/or machine learning techniques such as supervised machine learning and unsupervised machine learning. Here, the term "subset" of a set is to be construed as including the entire set or only a portion of the set. The process of generating a customized code bundle may be an iterative process in which the remote server may infer a code bundle that would make the IoT device successfully integrated with the access point. The remote server may test or determine whether the inferred code bundle does cause the IoT device to be successfully integrated with the access point. If necessary, the remote server may iteratively infer other code bundles if the code bundle does not result in successful integrating of the IoT device until a code bundle is identified to successfully integrate the IoT device. The remote server may modify or replace an inferred code bundle based on the inputs from the users and/or training of a machine learning model.

FIG. 1A is an exemplary illustration of a computing system 100 that generates customized code bundles for different IoT devices. The description below provides an overview of the process of integrating an IoT device. Further details will be provided in subsequent FIGS. The computing system 100 includes an access point 110 which includes a USB (Universal Serial Bus) connection port 112, an Ethernet connection port 114, and an Ethernet port 116 that connects the access point 110 to a router 120. Additional USB connection ports and/or Ethernet connection ports, and other suitable ports, may be present on the access point 110 while not shown in FIG. 1A. In some embodiments, the USB connection port 112 and the Ethernet connection port 114 may connect to IoT devices. In some examples, the USB connection port 112 may be implemented with a serial over USB protocol. In a particular example, a chip that carries out the serial over USB protocol may translate incoming serial signals into USB signals to simulate a serial port, for instance, compliant with a RS (Recommended Standard)-232 or a related standard such as RS-485 or RS-422. In other examples, instead of a serial over USB protocol, the USB connection port 112 may be implemented with an Ethernet over USB protocol, which connects an IoT device via a USB connection while providing an Ethernet communication interface for the IoT device. One particular Ethernet over USB protocol is the USB Communication Device Class Ethernet Emulation Model (USB CDC EEM). In some examples, the Ethernet connection port 114 may be Power over Ethernet (PoE) compatible, so that an IoT device connected to the Ethernet connection port 114 would be able to draw power simultaneously while transmitting and receiving data. In some examples, the Ethernet connection port 114 may have a daisy chain topology so that additional devices may draw power simultaneously while transmitting and receiving data. If an IoT device connected at the Ethernet connection port 114 is idle for longer than a threshold duration of time, a delivery of power to that IoT device may be terminated. Non-limiting examples of IoT devices that may be connected at either the USB connection port 112 or the Ethernet connection port 114 include an image sensor, a HVAC (Heating, Ventilation, and Air Conditioning) sensor, an energy measuring device, a smoke sensor, a light sensor or controller, an acoustic sensor, an environmental sensor such as a temperature or humidity sensor, an electronic label, and a gunshot detector. Once an IoT device is plugged into the USB connection port 112 or the Ethernet connection port 114, an operating system of the access point 110 may recognize attributes of the IoT device, and/or prompt a user to input any attributes, for example, that the operating system cannot recognize.

However, an IoT device cannot simply be plugged in to the USB connection port 112 or the Ethernet connection port 114 and automatically gain access to a wireless network while exchanging data. Rather, an operating system of the access point 110 needs to recognize an IoT device first, as an initial security measure. Additionally, setup, configuration, and communication parameters need to be established for an IoT device, and transmitted messages from an IoT device need to be decoded into decipherable packets or messages. Because many IoT devices have different, and sometimes proprietary, wireless protocols that are incompatible with the wireless protocol of the access point, a manner of connecting each type of IoT device to a wireless network through an access point needs to be customized to a particular type of IoT device.

As previously explained, in current approaches where the access point 110 itself integrates IoT devices into wireless networks by providing wireless access and establishing communication for IoT devices, the access point 110 has an increased storage requirement and a large image size as a result of having to store information of different IoT devices and protocols. Additionally, the access point 110 is not able to easily update protocols because such protocols are tightly integrated into the operating system of the access point, which is only updated at scheduled times. When protocols are not updated, certain IoT devices may be unable to be integrated into wireless networks, thus compromising a functionality and utility of the IoT devices.

Therefore, in examples described herein, instead of the access point 110, a remote server 130 is used to integrate IoT devices into the wireless networks, thereby decoupling the integration of IoT devices from the access point 110. The remote server 130 may include a computing system or component (hereinafter "computing component") 131 and a database 132. Components of the remote server 130, unlike the operating system of the access point 110, may be easily updated or modified at any time, thus improving an efficiency and efficacy of integrating IoT devices into wireless networks. The access point 110 receives, from the remote server 130, a generated code bundle and loads individual components of the generated code bundle to establish secure communication with a device physically connected to the access point 110.

The remote server 130 may be a cloud server, in some embodiments. The remote server 130 may receive, from the operating system of the access point 110, the attributes of an IoT device 101 attempting to be integrated into a wireless network at the access point 110. The attributes are characteristics of the IoT device 101 that are identified or otherwise provided to the remote server 130 and compared with attributes of other stored IoT devices to integrate the IoT device 101. The attributes may include, for example, a type of device, a vendor identification, a product identification, a serial number, a manufacturer string, a product string, a version, and/or a format of outputted data from the device (e.g., ASCII, JSON). The database 132 may store all IoT devices, or other devices, that have previously successfully been integrated or have attempted integration but failed, at the access point 110. Additionally, the database 132 may store the attributes and data regarding the IoT devices, respective associated code bundles provided to the IoT devices in order to integrate the IoT devices, and/or received messages from the IoT devices during the integration. The computing component 131 of the remote server 130 may generate a customized code bundle based at least in part on the attributes of the IoT device 101, and/or based on input or feedback from one or more users. The users may refer to an entity attempting to integrate a device at the access point 110, or an engineer who enters additional parameters of a device and/or operating or supervising the access point 110. The computing component 131 may compare the attributes of the IoT device 101 with attributes of the other devices stored in the database 132. The computing component 131 may generate a customized code bundle to be a same or similar to a code bundle provided to one of the devices in the database 132 having a highest degree of similarity to the IoT device 101. If the generated customized code bundle does not successfully integrate the IoT device 101 at the access point 110, the computing component 131 may modify the generated code bundle based on inputs from the users, training of a machine learning model, and/or based on another one of the devices in the database 132 having a next highest degree of similarity to the device 101. Further details of the computing component 131 are described below.

Figure 1B:
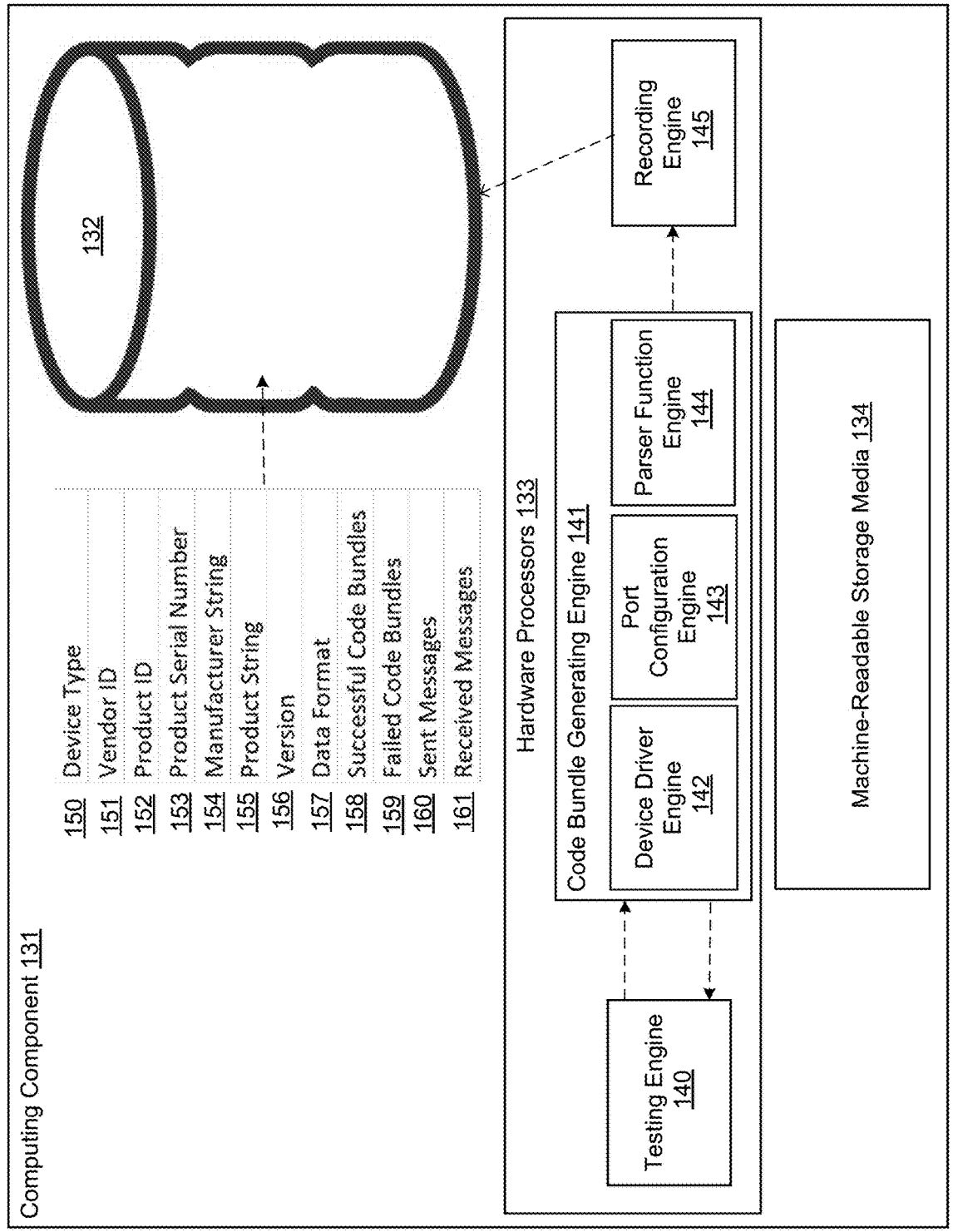
FIG. 1B is an exemplary illustration of a computing component within the computing system of FIG. 1A that generates a code bundle, according to embodiments described in the present disclosure.

As shown in FIG. 1B, the computing component 131 may include a testing engine 140, a code bundle generating engine 141, and a recording engine 145. The testing engine 140 may receive a code bundle generated by the code bundle generating engine 141 and determine whether that received code bundle results in a successful integration of the IoT device 101. The testing or determination process may include transmitting a test message to the IoT device 101 along with the code bundle and analyzing an output or message transmitted by the IoT device 101 in response to the transmission. The testing engine 140 may then send a result of the test to one or more of a device driver engine 142, a port configuration engine 143, and a parser function engine 144. For example, the testing engine 140 may send a result indicating that the integration failed if the integration did fail. The testing engine 140, the code bundle generating engine 141, the device driver engine 142, the port configuration engine 143, the parser function engine 144 and the recording engine 145 can refer to logic embodied in hardware or firmware.

The code bundle generating engine 141 may include the device driver engine 142, the port configuration engine 143, and the parser function engine 144. The code bundle generating engine 141 may be executed by processor(s) of the computing component 131 to perform various operations including those operations described in reference to the device driver engine 142, the port configuration engine 143, and the parser function engine 144, and/or additionally to integrate or synchronize outputs from the device driver engine 142, the port configuration engine 143, and the parser function engine 144 before transmitting to the testing engine 140. The code bundle generating engine 141 may also transmit, to the access point 110, a code bundle that has been verified to result in a successful integration of the IoT device 101. The device driver engine 142, the port configuration engine 143, and the parser function engine 144, may generate different individual components of the code bundle, while the recording engine 145 may store data, such as log data, acquired during the integration process or a failed integration process into the database 132 so that the data may be referenced during future integrations of an IoT device, and/or further be used to update any of the protocols or scripts used by the device driver engine 142, the port configuration engine 143, and/or the parser function engine 144. In some instances, one or more of the testing engine 140, the code bundle generating engine 141, and the recording engine 145, and/or the device driver engine 142, the port configuration engine 143, and the parser function engine 144, may be combined or integrated into a single processor, and some or all functions performed by one or more of the aforementioned engines may not be spatially separated, but instead may be performed by a common processor. In some embodiments, at least some of the functions of the testing engine 140, the device driver engine 142, the port configuration engine 143, the parser function engine 144, and the recording engine 145 may be performed in parallel.

The testing engine 140 may compare the attributes of the IoT device 101 with attributes of other devices stored in the database 132. In some embodiments, the testing engine 140 may determine whether the database 132 includes an exact matching device to the IoT device 101. An exact matching device means that all attributes of the IoT device 101 match all attributes of one of the other devices stored in the database 132. If the testing engine 140 determines that the database 132 includes an exact matching device, the testing engine 140 may transmit the information of the exact matching device to the access point 110 and/or to the device driver engine 142, the port configuration engine 143, and the parser function engine 144.

In such a scenario, the device driver engine 142 may select a device driver corresponding to the exact matching device, which resulted in successful enumeration of the exact matching device at the access point 110. A device driver, illustrated symbolically as a device driver 202 of FIG. 2, may allow successful enumeration of the IoT device 101 with the operating system of the access point 110, so that the operating system recognizes the IoT device 101, records its attributes and/or other characteristics, and ensures that the IoT device 101 is legitimate and not trying to mount an attack. In some embodiments, the device driver 202, and all possible drivers, are initially decoupled from the access point 110, meaning that a device attempting to connect to the access point 110 cannot initially access the device driver 202 until that device is validated by the access point 110. Such a decoupling prevents a malicious device from simultaneously launching an attack on both the device driver 202 and the access point 110 before the malicious device can be validated. The device driver 202 may be platform specific, meaning that it is specific to the particular architecture and version of the access point 110.

Meanwhile, the port configuration engine 143 may auto-generate port configuration parameters and a shared library corresponding to the exact matching device, which previously resulted in successful integration and transmission of data from the exact matching device at the access point 110. Port configuration parameters are symbolically illustrated as port configuration parameters 203 in FIG. 2. The port configuration parameters 203 may include low level connection parameters that specify terminal settings of the IoT device 101 while connected to the access point 110. In some embodiments, the port configuration parameters 203 comprise a baud rate, a line discipline, options for the open ( ) call such as O_RDWR, O_NOCTTY, O_NDELAY, and termios function settings such as control modes (CS8, CLOCAL, CREAD), input modes (ICANON, IGNPAR), output modes, and local modes. These port configuration parameters may constitute a portion of a shared library generated by the port configuration engine 143. The port configuration engine 143 may further generate other portions of the shared library, including functions that open or close a serial port (e.g., the USB port 112 or the Ethernet port 114) to which the IoT device 101 is connected. The port configuration engine 143 may further export a file descriptor of the IoT device 101 to enable a process, such as a handler process at the access point 110, to read bytes from the serial port.

Additionally, the parser function engine 144 may autogenerate a same parser function corresponding to the exact matching device, which previously resulted in successful integration and transmission of data from the exact matching device at the access point 110. A parser function is symbolically illustrated in FIG. 2 as parser function 204. The parser function 204 converts a serial byte stream from the IoT device 101 into coherent information, and a callback that will be invoked when the information is ready to be transported to a destination. The parser function 204 may be a customized function that converts a byte stream input into an opaque buffer containing the information in the byte stream, in a format supported by the IoT device 101. Exemplary formats may include a raw packet, ASCII, JSON string, Google Protocol Buffer message, and XML (Extensible Markup Language) string. The parser function may assemble the byte stream into messages that contain a header, a footer, a payload, CRC (cyclic redundancy check) fields, and/or and other applicable sections of a message.

In a different scenario in which the testing engine 140 determines that the database 132 does not have an exact matching device, but the database does have a device that matches only a portion of attributes, meaning some but not all of the attributes, of the IoT device 101, the testing engine 140 may transmit an alert to the access point 110 that the IoT device 101 partially matches a device in the database 132. In turn, the access point 110 may issue a prompt for an input or feedback from an entity, such as a user seeking to integrate the IoT device 101, an engineer familiar with the IoT device 101, and/or an operator or supervisor of the access point 110. While awaiting the input or the feedback, or alternatively, in other embodiments, without transmitting an alert of a partial match, the testing engine 140 may determine, from the database 132, a device having a highest degree of similarity with the IoT device 101. Such a device may be determined based on a number of matching attributes. For example, the device having the highest degree of similarity may have the highest number of matching attributes with the IoT device 101 compared to all other devices in the database 132. Thus, in such a scenario, all attributes are weighted equally. Alternatively, a device having a highest degree of similarity may be determined by a decision tree algorithm in which nodes indicate a hierarchy of the attributes, or a k-nearest neighbor algorithm. In a decision tree algorithm, some attributes may be weighted more heavily than others. For example, a manufacturer identification number (indicating a manufacturer of the IoT device 101) may be weighted more heavily compared to a version identification number (indicating a version of the IoT device 101) because the code bundle used may not vary or may vary only minimally between different versions. In a k-nearest neighbor algorithm, a set of attributes of the IoT device 101 may be compared with respective sets of attributes of the other devices in the database 132 to determine an overall similarity measure between the attributes of the IoT device 101 and other respective sets of attributes of the other devices. Here, the attributes may be weighted unequally. In some embodiments, the k-nearest neighbor algorithm may determine an overall similarity measure of all attributes together, rather than determining a similarity between each attribute one-by-one, as in a decision tree algorithm.

Thus, the device having the highest degree of similarity may have particular attributes that match the attributes of the IoT device 101. The testing engine 140 may transmit, to the device driver engine 142, the port configuration engine 143, and the parser function engine 144, the device having the highest degree of similarity so that the device driver engine 142, the port configuration engine 143, and the parser function engine 144 can generate or select an appropriate component of the code bundle. In some examples, if all devices in the database 132 have degrees of similarity with the IoT device 101 that are lower than a threshold similarity, the device driver engine 142 may transmit a query to the operating system of the access point 110, which may in turn prompt a user for input or feedback.

Once the testing engine 140 sends to the device driver engine 142 a closest matching device in the database 132, the device driver engine 142 may optionally include a machine learning model to determine a correct or appropriate device driver using an unsupervised machine learning model or algorithm. The device driver engine 142 may determine which device driver was provided to the device having the highest degree of similarity with the IoT device 101, during a previous integration of the device with the access point 110. The device driver that was provided to the device during an integration of the device may be referred to as a mapped device driver or a corresponding device driver, which may refer to a device driver that resulted in successful enumeration of that device. The device driver engine 142 may determine that mapped or corresponding device driver as the correct or appropriate device driver and select that mapped or corresponding device driver to be included in the code bundle. Because a possible number of device drivers may be finite, an unsupervised machine learning model or algorithm may be utilized.

In addition, once the testing engine 140 sends to the port configuration engine 143 a closest matching device in the database 132, the port configuration engine 143 may be trained to make an inference of correct port configuration parameters and a shared library using an unsupervised machine learning model or algorithm, in some embodiments. The training process may include providing instructions to the machine learning model to output the same combination of port configuration parameters and shared library as that corresponding to the closest matching device in the database 132. Thus, the machine learning model may output the port configuration parameters and the shared library corresponding to the device having the highest degree of similarity with the IoT device 101, during a previous integration, with the access point 110, of the device having the highest degree of similarity. The port configuration engine 143 may autogenerate the same port configuration parameters and shared library as that corresponding to the device, to be included in the code bundle.

In some embodiments, if the autogenerated port configuration parameters and/or the shared library are incompatible with the IoT device 101, the machine learning model may be trained by providing instructions to the machine learning model to iteratively output other combinations of port configuration parameters and the shared library that correspond to other devices stored in the database 132 having next highest degrees of similarity. In some embodiments, the machine learning model may be trained by providing instructions to the machine learning model to iteratively output combinations of port configuration parameters and the shared library from a same or different devices in the database 132 that all have at least a threshold level of similarity to the IoT device 101.

Moreover, once the testing engine 140 sends to the parser function engine 144 a closest matching device in the database 132, the parser function engine 144 may include a trained machine learning model trained using an unsupervised and/or a supervised machine learning technique, model, or algorithm, to make an inference of a correct or appropriate parser function for the IoT device 101. The training process may include providing instructions to the machine learning model to output the same parser function as that corresponding to the closest matching device in the database 132. The parser function engine 144 may determine the parser function corresponding to the device having the highest degree of similarity with the IoT device 101, during a previous integration of the device with the access point 110. The parser function engine 144 may autogenerate the same parser function as that corresponding to the device, to be included in the code bundle. In some embodiments, if the autogenerated parser function is incompatible with the IoT device 101, the machine learning model may be trained by providing instructions to the machine learning model to iteratively output other parser functions that correspond to other devices stored in the database 132 having next highest degrees of similarity.

The supervised machine learning model or algorithm may infer changes to a previously used parser function that would be required to successfully convert data from the IoT device 101, as a form of troubleshooting. Parser functions are not necessarily discrete, unlike device drivers and port configuration parameters/shared libraries, which have only a finite and discrete number of possibilities. The parser function engine 144 may identify a cause and/or source of a problem in the previously used parser function, identify whether a same or similar type of problem previously occurred, as stored, for example, in the database 132, and determine what code changes resolved this problem. The training process may involve using a training dataset that includes, as inputs, types of problems of parser functions, and as outputs, solutions or changes such as code modifications to resolve or rectify the respective problems. For example, if a previously used parser function was unable to assemble a header portion of a byte stream received from the IoT device 101, the parser function engine 144 may determine if a similar or same problem occurred previously in a different device, and if so, determine what code changes, additions, and/or deletions resolved such a problem. The parser function engine 144 may apply same or similar code changes, additions, and/or deletions used to resolve this problem previously and determine whether the header portion is assembled. In another example, the parser function engine 144 may determine if a version change caused a previously used parser function to no longer be compatible, whether a similar or same type of version change occurred previously in a same of different type of IoT device, and what changes to a parser function occurred during that instance of a version change. In other embodiments, the supervised machine learning model may learn based on feedback or input from an entity. For example, a user may provide feedback regarding code changes, additions, and/or deletions that would be required to rectify a parser function so that it operates properly on the IoT device 101. The parser function engine 144 may learn based on this feedback so that if a same or similar type of problem occurred in the future, the parser function engine 144 may be able to resolve such a problem.

The code bundle generating engine 141 may combine components generated by the device driver engine 142, the port configuration engine 143, and the parser function engine 144 into a code bundle and transmit the combined bundle to the testing engine 140. In some examples, the testing engine 140 may transmit the combined code bundle to a user and prompt the user for feedback regarding whether the combined code bundle is appropriate. If the user indicates that the combined code bundle is inappropriate, the combined code bundle may be discarded and another one generated, using a process described below. Otherwise, the testing engine 140 determines whether the combined code bundle results in a successful integration of the IoT device 101 at the access point 110. The determination process may include transmitting a test message to the IoT device 101 and determining whether a reply to the test message was sent to the testing engine 140 from the IoT device 101. The test message may be transmitted using the generated code bundle. In response to determining that the IoT device 101 sent a reply to the test message, the testing engine 140 may decode or interpret the reply, to determine if the reply is complete and of a recognizable or defined format such as ASCII or JSON. To determine whether the reply is complete, the testing engine 140 may determine if the reply is organized in a format that contains a header, a footer, a payload, CRC fields, and/or and other applicable sections of a message. Upon a positive determination of the aforementioned, the testing engine 140 may determine that the combined code bundle results in a successful integration of the IoT device 101. If the combined code bundle results in a successful integration with the IoT device 101, the testing engine 140 may transmit the combined code bundle to the access point 110. In some embodiments, the testing engine 140 may transmit a message to a user and/or request input or feedback prior to actually transmitting the combined code bundle to the access point 110.

However, if the testing engine 140 determines that the combined code bundle does not result in a successful integration, the testing engine 140 may troubleshoot to determine which component or components prevented the successful integration. The determination of which component or components prevented the successful integration may be based on whether a response or reply was received at the access point 110, and/or particular content or information indicated by the response or reply. Any responses or replies received at the access point 110 may be detected by the testing engine 140 of the remote server 130. For example, if no reply was received, the testing engine 140 may determine that the device driver is incompatible with the IoT device 101. In addition, in such a scenario, the port configuration parameters and/or the shared library may also be incompatible with the IoT device 101. If a reply is received but incomplete, the testing engine 140 may first determine whether the device driver is incorrect. This determination may depend on whether the reply indicates that the IoT device 101 has been enumerated at a port with the operating system of the access point 110. If the device driver is incorrect, the device driver will not enumerate a port with the operating system of the access point 110, so the remote server 130 would not receive an indication that the IoT device 101 is enumerated. However, if the remote server 130 receives a response that the IoT device 101 is enumerated, then the device driver is correct. Furthermore, if the IoT device 101 is enumerated but the port configuration parameters fail, when a read from the device is requested, none or a minimal amount of data would be read from the device. The remote server 130 would then receive an indication that a request-response or a request-reply between the access point 110 and the device would fail because the access point 110 would not detect a response in time. Additionally, if the device driver and the port configuration parameters are correct but the parser function is incorrect or inadequate, then the reply would not be properly parsed. For example, the reply may not be organized in a format that contains a header, a footer, a payload, CRC fields, and/or and other applicable sections of a message.

The testing engine 140 may repeat the process described above with respect to the device having a highest degree of similarity with the IoT device 101, but instead iteratively determine other devices in the database 132 having equal degrees of similarity compared to the IoT device 101, and next or successively high degree of similarity.

As an illustrative example, if the testing engine 140 determined a device ("device A") in the database 132 having five attributes in common with the IoT device 101 as the device having a highest degree of similarity with the IoT device 101, but that corresponding device driver of device A was not appropriate for or compatible with of the IoT device 101, the testing engine 140 may proceed to select another device ("device B"), that also has five attributes, in common with the IoT device 101. The testing engine 140 may transmit information of device B to the device driver engine 142, the port configuration engine 143, and/or the parser function engine 144, depending on which component or components is/are incompatible. For example, if the parser function is incompatible but the other components are compatible, the testing engine 140 may only transmit information of the device B to the parser function engine 144. The device driver engine 142, the port configuration engine 143, and the parser function engine 144 may autogenerate respective components mapped to the device B.

If the corresponding components of device B failed to be appropriate for or compatible with the IoT device 101, and no other device in the database 132 has five attributes in common with the IoT device 101, the device driver engine 142 may proceed to select another device ("device C") having four attributes in common with the IoT device 101, and determine whether the corresponding component or components mapped to the device C, in particular, the component or components were identified as incompatible in the previous iteration of device B, are appropriate for or compatible with the IoT device 101. At each iteration, the testing engine 140 may transmit information of the corresponding components to the access point 110, which may transmit the information to a user.

The recording engine 145 records, into the database 132, data including, but not limited to, a device type 150 of the IoT device 101, a vendor identification 151, a product identification 152, a product serial number 153, a manufacturer string 154, a product string 155, a version 156 of the product, a data format 157 used by the product to output the data, successful code bundles 158 that were tested and determined to successfully integrated the IoT device 101, any failed code bundles 159 that were attempted or inferred but did not result in successful integration of the IoT device 101, sent messages 160 that may include test messages sent by the testing engine 140 to the IoT device 101 during integration, and received messages 161 that may include messages received from the IoT device 101 in response to the sent messages 160. The sent messages 160, in some examples, may include inputs sent to parser functions that were inferred and tested, and the received messages 161 may include respective outputs from the parser functions. Such data may enable the remote server 130 to know whether the generated code bundle is sending useful messages to the remote server 130, which provides an indication of whether the generated code bundle can properly parse bytes from the IoT device 101. Additionally, statistics such as a number of bytes fed to a parser function, a number of messages generated, time per generated message, messages forwarded to a destination server, messages acknowledged by a destination server may be used to monitor a health of the shared library usage. The recording engine 145 may associate or map a generated code bundle by the device driver engine 142, the port configuration engine 143, and the parser function engine 144, to the IoT device 101 so that the computing component 131 may learn the mapping and apply the mapping if a same or similar device as the IoT device 101 connects to the access point 110 in the future. As alluded to earlier with respect to FIG. 1A, the database 132 also includes such previous data collected during previous integrations of other IoT devices.

Figure 2:
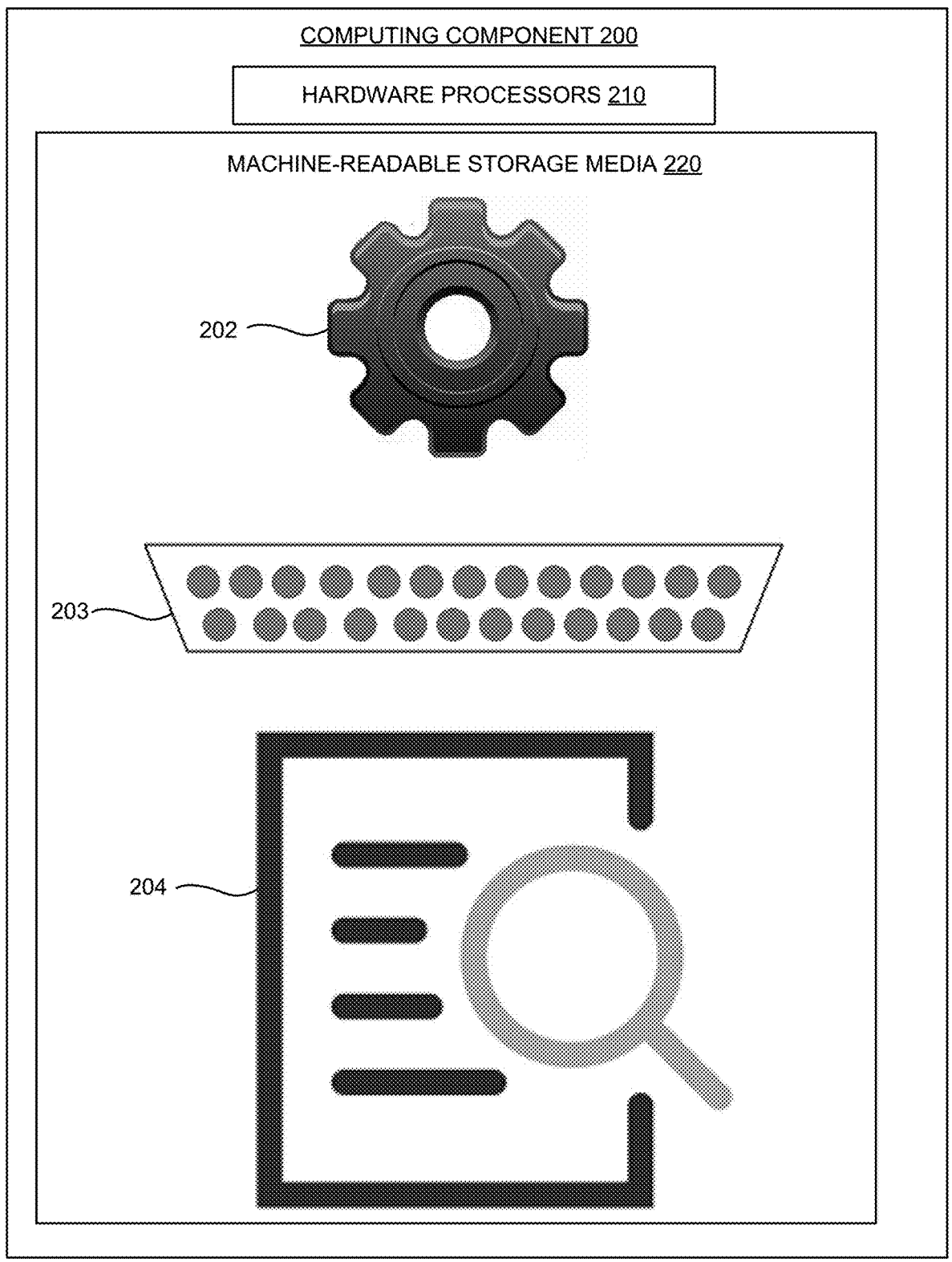
FIG. 2 is an exemplary illustration of a generated code bundle, according to embodiments described in the present disclosure.

FIG. 2 illustrates a computing component 200 that includes one or more hardware processors 210 and machine-readable storage media 220 storing a set of machine-readable/machine-executable instructions that, when executed, cause the hardware processor(s) 210 to generate, the device drivers 202, the port configuration parameters 203, and the parser functions 204. The computing component 200 may be implemented as the computing component 131 of FIGS. 1A and 1B. The machine-readable storage media 220 may include suitable machine-readable storage media described in FIG. 8.

Figure 3:
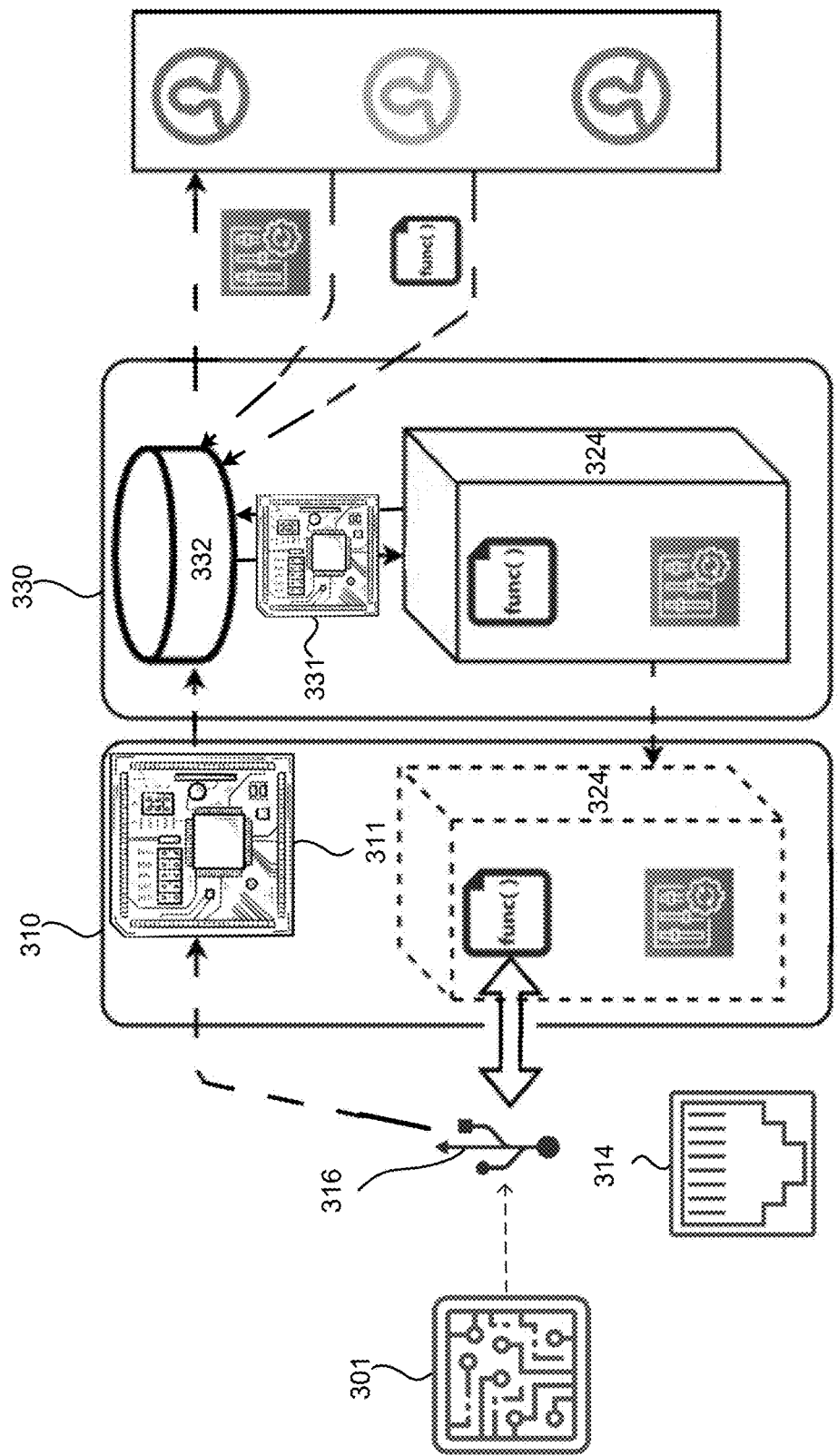
FIG. 3 is an exemplary flow diagram consistent with FIGS. 1A-1B and 2, according to embodiments described in the present disclosure.

FIG. 3 is an exemplary flow diagram, according to embodiments described in the present disclosure. In FIG. 3, a third-party device 301, such as an IoT device (e.g., the IoT device 101), may be plugged in at a port 316 of an access point 310. FIG. 3 summarizes an exemplary embodiment consistent with that described previously with respect to FIGS. 1A and 1B, while including additional details of functions of the access point 310. The access point 310 may be implemented as the access point 110 of FIG. 1A. The access point 310 may further include an Ethernet port 314 and one or more computing components 311, which may include one or more hardware processors and machine-readable storage media storing a set of machine-readable/machine-executable instructions that, when executed, cause the hardware processor(s) hardware processor(s) to perform the functions of the access point 310. The access point 310 may receive a notification that the third-party device 301 has connected to the access point 310. The access point 310 may pass attributes of the third-party device 310 to a server 330, which may be a cloud server and implemented, for example, as the remote server 130 of FIG. 1A. The server 330 may include one or more computing components 331, which may be implemented as the computing component 131. The server 330 may determine whether the third-party device 310 is known. If the third-party device 310 is unknown, the server 330 may generate an alert of an unknown device to the access point 310 and/or to an entity managing the access point 310. In some embodiments, the entity may provide an input of a device driver, port configuration parameters, and parser functions to the server 330. The server 330 may generate a code bundle 324 based on the provided input. The code bundle 324 is sent to the access point 310. The access point 310 may install the components from the code bundle 324, which allow a handler process of the access point 310 to establish communications with the third-party device. The access point 310 may install a device driver that allows for the third-party device to be enumerated as a serial port on the access point 310. The handler process communicating with the third-party device then receives a notification with a path to a library location of a shared library on the access point 310. The handler process dynamically loads the shared library from the code bundle 324. After the shared library is loaded, the handler process may search for symbols in the library and assign them to function pointers, in effect using them as if the library were linked to the process. The handler process invokes functions from the library in a sequential order of: open, configure port, retrieve descriptor, read serial data, send serial data to parser function and data ready callback. During the process of reading the serial data, the handler process does not interpret or log actual contents of the data so that the contents of the data are kept secured.

Figure 4:
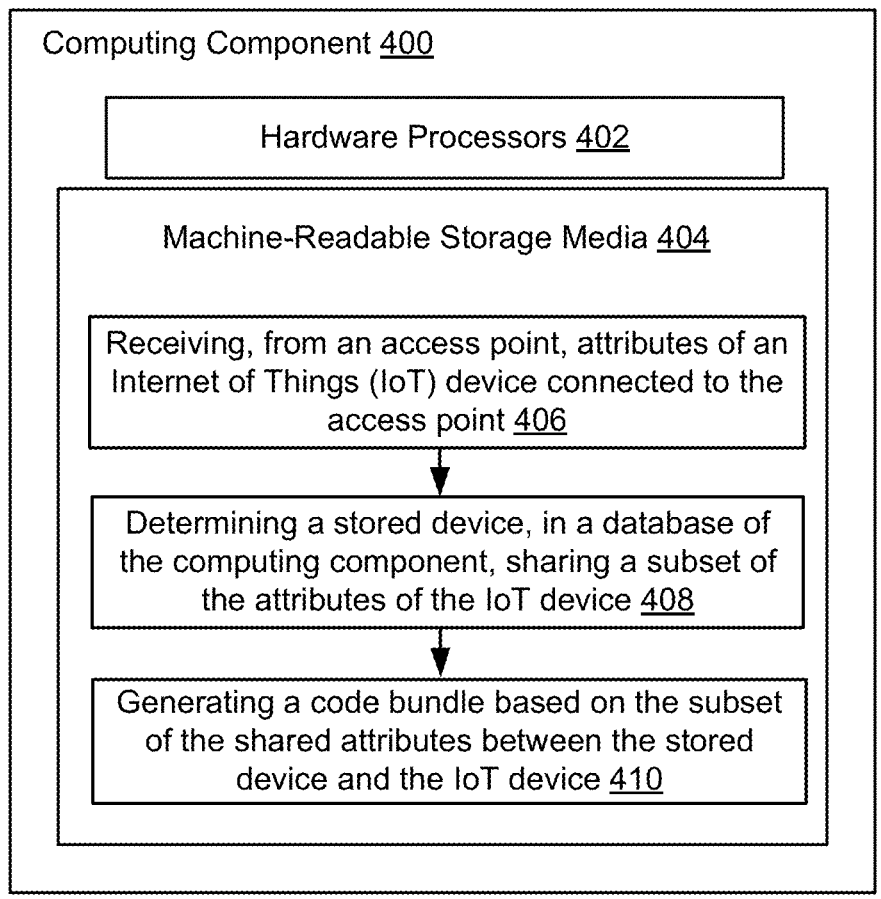
FIG. 4 is an exemplary flowchart, illustrating how a code bundle is generated based on attributes of an IoT device, according to embodiments described in the present disclosure.

FIG. 4 illustrates a computing component 400 that includes one or more hardware processors 402 and machine-readable storage media 404 storing a set of machine-readable/machine-executable instructions that, when executed, cause the hardware processor(s) 402 to perform an illustrative method of generating a code bundle. It should be appreciated that there can be additional, fewer, or alternative steps performed in similar or alternative orders, or in parallel, within the scope of the various embodiments discussed herein unless otherwise stated. The computing component 400 may be implemented as the computing component 131 of FIGS. 1A and 1B. The machine-readable storage media 404 may include suitable machine-readable storage media described in FIG. 8.

At step 406, the hardware processor(s) 402 may execute machine-readable/machine-executable instructions stored in the machine-readable storage media 404 to receive, from an access point such as the access point 110 in FIGS. 1A and 1B, attributes of an IoT device, such as the IoT device 101, connected to the access point. Next, at step 408, the hardware processor(s) 402 may determine a stored device sharing a subset of the attributes of the IoT device, in a database such as the database 132 of the computing component 400. A subset of the attributes can include some or all of the attributes. Next, at step 410, the hardware processor(s) 402 may generated a code bundle based on the subset of the shared attributes between the stored device and the IoT device, as described with reference to previous FIGS. such as FIGS. 1A and 1B. The code bundle may include a device driver to enumerate the IoT device with an operating system of the access point in order to establish an interface through which the IoT device communicates at the access point, port configuration parameters that specify terminal settings of the IoT device, the port configuration parameters including a baud rate, a line discipline, an input mode, an output mode, and a termios function setting, and a parser function to decipher messages sent by the IoT device.

Figure 5:
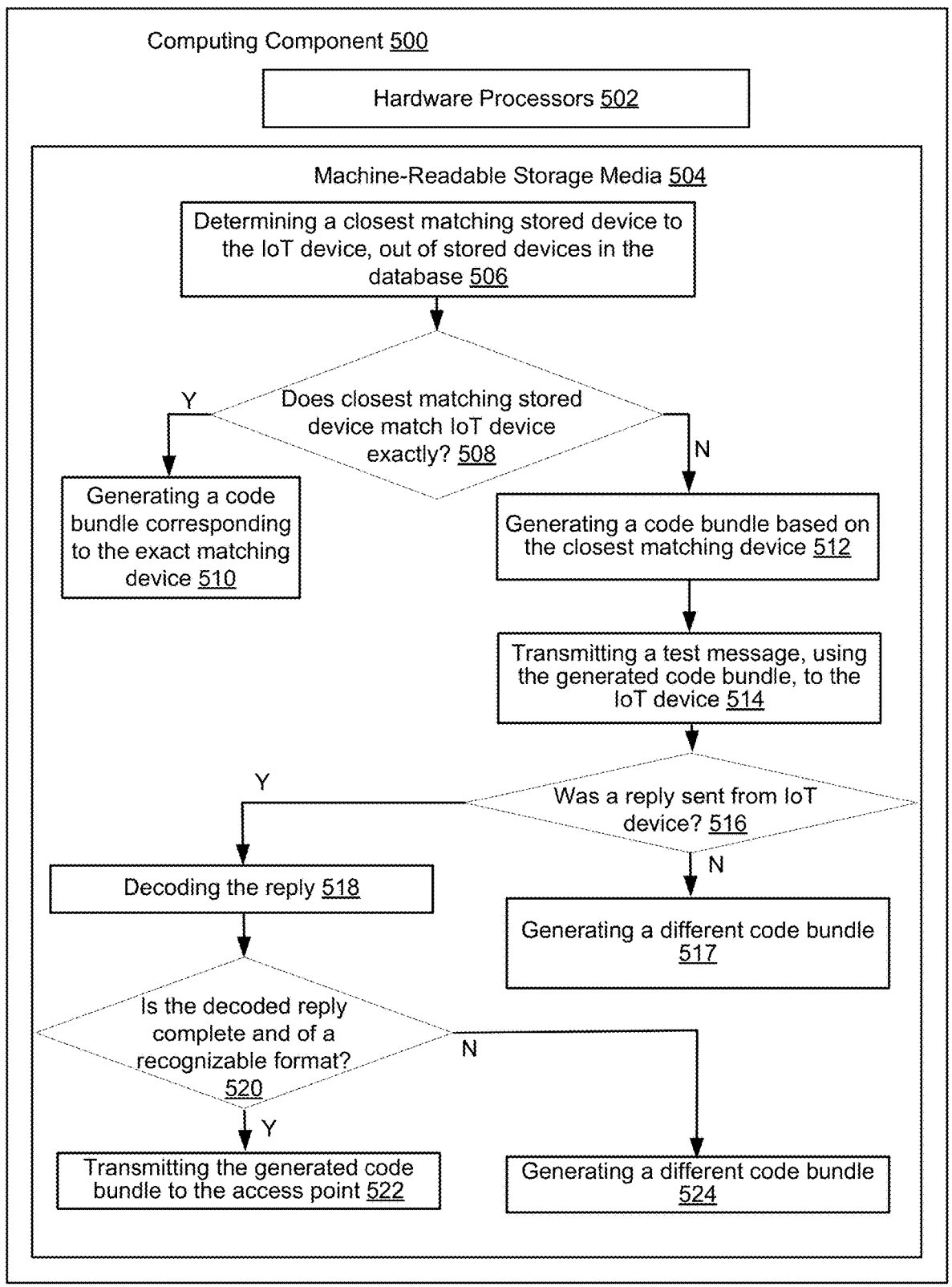
FIG. 5 is an exemplary flowchart, illustrating how a code bundle is generated depending on whether an IoT device exactly matches a stored IoT device, according to embodiments described in the present disclosure.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of generating a code bundle. It should be appreciated that there can be additional, fewer, or alternative steps performed in similar or alternative orders, or in parallel, within the scope of the various embodiments discussed herein unless otherwise stated. The computing component 500 may be implemented as the computing component 131 of FIGS. 1A and 1B. The machine-readable storage media 504 may include suitable machine-readable storage media described in FIG. 8. The methods. The steps or decisions of FIG. 5 provide a further example of steps 408 and 410 from FIG. 4.

At step 506, the hardware processor(s) 502 may execute machine-readable/machine-executable instructions stored in the machine-readable storage media 504 to determine a closest matching stored device to the IoT device (e.g., the IoT device 101), out of stored devices in the database (e.g., the database 132) The closest matching stored device may be synonymous with a device having a highest degree of similarity, as described with respect to FIGS. 1A and 1B. The criteria of determining such a closest matching stored device may be a same criteria as described with respect to FIGS. 1A and 1B. For example, the criteria may include any one or combination of a number of attributes shared between the closest matching stored device and the IoT device, a decision tree algorithm in which nodes indicate a hierarchy of the attributes, and a k-nearest neighbor algorithm. At decision 508, the hardware processor(s) 502 may execute machine-readable/machine-executable instructions stored in the machine-readable storage media 504 to determine whether the closest matching stored device matches the IoT device exactly, meaning that all attributes from the closest matching stored device and the IoT device match, or whether at least one of the attributes differ. If the closest matching stored device matches the IoT device exactly, the hardware processor(s) 502 may, in step 510, execute machine-readable/machine-executable instructions stored in the machine-readable storage media 504 to generate a same code bundle corresponding or mapped to the exact matching device, which may in turn be sent to the access point (e.g., the access point 110) to enable the IoT device to access a wireless network at the access point and communicate through the access point.

However, if the closest matching stored device does not match the IoT device exactly, the hardware processor(s) 502 may, in step 512, execute machine-readable/machine-executable instructions stored in the machine-readable storage media 504 to generate a same code bundle corresponding or mapped to the closest matching device. This generated code bundle needs to be validated to make sure it is compatible with the IoT device and can be integrated with the IoT device at the access point. The validation process entails, first, transmitting a test message, using the generated code bundle, to the IoT device in step 514. Next, in decision 516, the hardware processor(s) 502 may execute machine-readable/machine-executable instructions stored in the machine-readable storage media 504 to determine whether a reply to the computing component 500 was sent from the IoT device. If no reply was sent from the IoT device, in step 517, the computing component 500 determines that the generated code bundle is not validated and needs to generate a different code bundle.

If a reply was sent from the IoT device, the hardware processor(s) 502 may, in step 518, execute machine-readable/machine-executable instructions stored in the machine-readable storage media 504 to decode the reply to determine whether the decoded reply is complete and of a recognizable format. In decision 520, the hardware processor(s) 502 may, in step 518, execute machine-readable/machine-executable instructions stored in the machine-readable storage media 504 to determine whether the decoded reply is complete and of a recognizable format. A complete reply is a reply having all the required components of a data packet or message, such as, a header, a footer, a payload, CRC fields, and/or and other applicable sections of a message. If one of the components is missing, the reply is determined to be incomplete. A recognizable format is a predefined data format, and may include, as some examples, a raw packet, ASCII, JSON string, Google Protocol Buffer message, and XML string. If the decoded reply is complete and of a recognizable format, the generated code bundle is validated and is transmitted to the access point in step 522 to enable the IoT device to access a wireless network at the access point and communicate through the access point. However, if the decoded reply is either incomplete or not of a recognizable format, the generated code bundle is determined not to be validated. Then, the hardware processor(s) 502 may, in step 524, execute machine-readable/machine-executable instructions stored in the machine-readable storage media 504 to generate a different code bundle.

Figure 6:
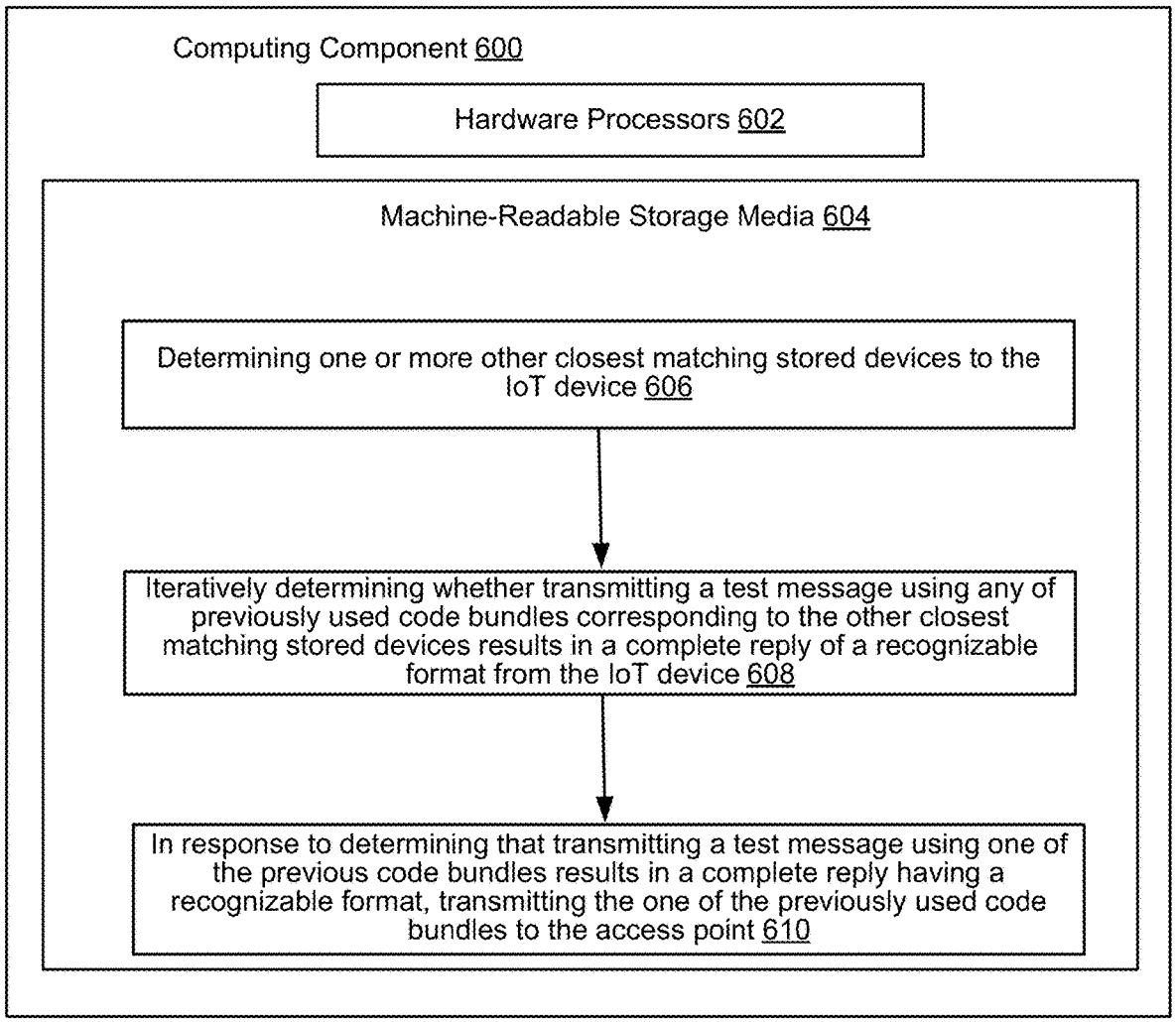
FIG. 6 is an exemplary flowchart, illustrating how another code bundle is generated if a code bundle corresponding to a closest matching IoT device is incompatible with an IoT device, according to embodiments described in the present disclosure.

FIG. 6 illustrates a computing component 500 that includes one or more hardware processors 602 and machine-readable storage media 604 storing a set of machine-readable/machine-executable instructions that, when executed, cause the hardware processor(s) 602 to perform an illustrative method of generating a code bundle. It should be appreciated that there can be additional, fewer, or alternative steps performed in similar or alternative orders, or in parallel, within the scope of the various embodiments discussed herein unless otherwise stated. The computing component 600 may be implemented as the computing component 131 of FIGS. 1A and 1B. The machine-readable storage media 604 may include suitable machine-readable storage media described in FIG. 8. The methods. The steps of FIG. 6 provide further details related to steps 517 and 524 from FIG. 5.

At step 606, the hardware processor(s) 602 may execute machine-readable/machine-executable instructions stored in the machine-readable storage media 604 to determine one or more other closest matching stored devices to the IoT device, which may include, closest matching stored devices out of remaining devices in the database, excluding the closest matching device from FIG. 5. At step 608, the hardware processor(s) 602 may execute machine-readable/machine-executable instructions stored in the machine-readable storage media 604 to iteratively determine whether transmitting a test message using any of previously used code bundles corresponding or mapped to the other closest matching stored devices results in a complete reply of a recognizable format from the IoT device. At step 610, In response to determining that transmitting a test message using one of the previous code bundles results in a complete reply having a recognizable format, the hardware processor(s) 602 may execute machine-readable/machine-executable instructions stored in the machine-readable storage media 604 to terminate the previous iterative process of step 608 and transmit the one of the previously used code bundles to the access point, meaning that the one of the previously used code bundles has been validated.

Figure 7:
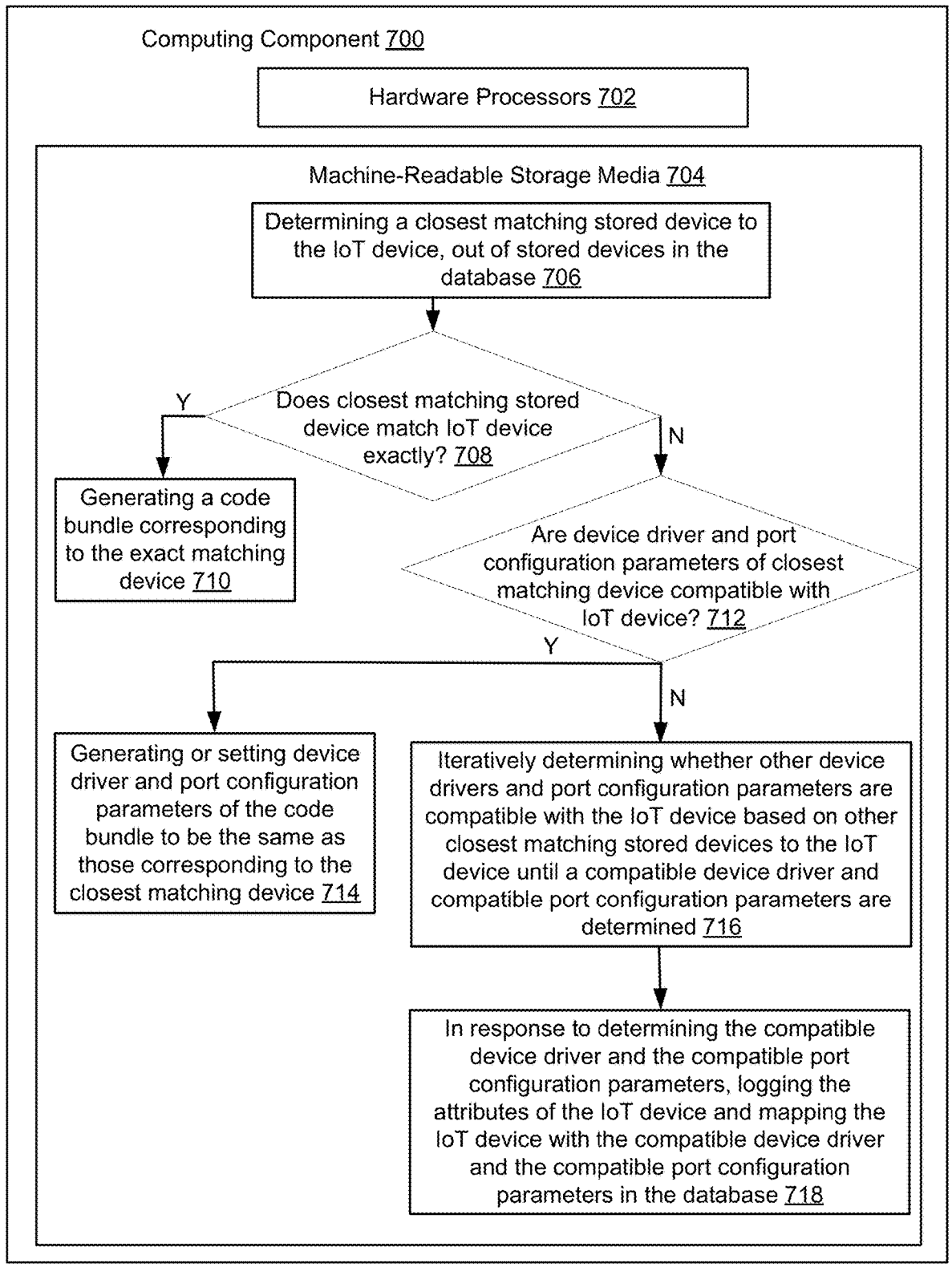
FIG. 7 is an exemplary flowchart, illustrating how a code bundle is generated depending on whether an IoT device exactly matches a stored IoT device, according to embodiments described in the present disclosure.

FIG. 7 illustrates a computing component 700 that includes one or more hardware processors 702 and machine-readable storage media 704 storing a set of machine-readable/machine-executable instructions that, when executed, cause the hardware processor(s) 702 to perform an illustrative method of generating a code bundle. It should be appreciated that there can be additional, fewer, or alternative steps performed in similar or alternative orders, or in parallel, within the scope of the various embodiments discussed herein unless otherwise stated. The computing component 700 may be implemented as the computing component 131 of FIGS. 1A and 1B. The machine-readable storage media 704 may include suitable machine-readable storage media described in FIG. 8. The methods. The steps or decisions of FIG. 7 provide a further example of steps 408 and 410 from FIG. 4.

At step 706, the hardware processor(s) 702 may execute machine-readable/machine-executable instructions stored in the machine-readable storage media 704 to determine a closest matching stored device to the IoT device (e.g., the IoT device 101), out of stored devices in the database (e.g., the database 132) The closest matching stored device may be synonymous with a device having a highest degree of similarity, as described with respect to FIGS. 1A and 1B. The criteria of determining such a closest matching stored device may be a same criteria as described with respect to FIGS. 1A and 1B. At decision 708, the hardware processor(s) 702 may execute machine-readable/machine-executable instructions stored in the machine-readable storage media 704 to determine whether the closest matching stored device matches the IoT device exactly, meaning that all attributes from the closest matching stored device and the IoT device match, or whether at least one of the attributes differ. If the closest matching stored device matches the IoT device exactly, the hardware processor(s) 702 may, in step 710, execute machine-readable/machine-executable instructions stored in the machine-readable storage media 704 to generate a same code bundle corresponding or mapped to the exact matching device, which may in turn be sent to the access point (e.g., the access point 110) to enable the IoT device to access a wireless network at the access point and communicate through the access point.

However, if the closest matching stored device does not match the IoT device exactly, the hardware processor(s) 702 may, in decision 712, execute machine-readable/machine-executable instructions stored in the machine-readable storage media 704 to determine whether a device driver and port configuration parameters of the closest matching device are compatible with the IoT device. Decision 712 may include determining whether applying the previously used device driver and port configuration parameters corresponding or mapped to the closest matching device results in a successful integration of the IoT device at the access point, such that the IoT device can transmit a message through the access point. In step 714, if the device driver and port configuration parameters of the closest matching device are compatible with the IoT device, the hardware processor(s) 702 may execute machine-readable/machine-executable instructions stored in the machine-readable storage media 704 to generate or set device driver and port configuration parameters of the code bundle to be the same as those corresponding to the closest matching device. On the other hand, in step 716, if the device driver and port configuration parameters of the closest matching device are incompatible with the IoT device, the hardware processor(s) 702 may execute machine-readable/machine-executable instructions stored in the machine-readable storage media 704 to iteratively determining whether other device drivers and port configuration parameters are compatible with the IoT device based on other closest matching stored devices to the IoT device until a compatible device driver and compatible port configuration parameters are determined. For example, step 716 may include determining whether a device driver and port configuration parameters used to integrate a second closest matching device are compatible with the IoT device. If the device driver and port configuration parameters are compatible, the iterative process is terminated. If the device driver and port configuration parameters are incompatible, the iterative process continues by determining whether a device driver and port configuration parameters used to integrate a third closest matching device are compatible with the IoT device. The iterative process may continue by determining compatibility of device driver and port configuration parameters corresponding or mapped to successively closest matching devices. In step 718, once a compatible device driver and the compatible port configuration parameters are determined, the iterative process of step 716 is terminated and the attributes of the IoT device are logged or recorded in a database (e.g., the database 132). The IoT device is then mapped with the compatible device driver and the compatible port configuration parameters in the database.

Figure 8:
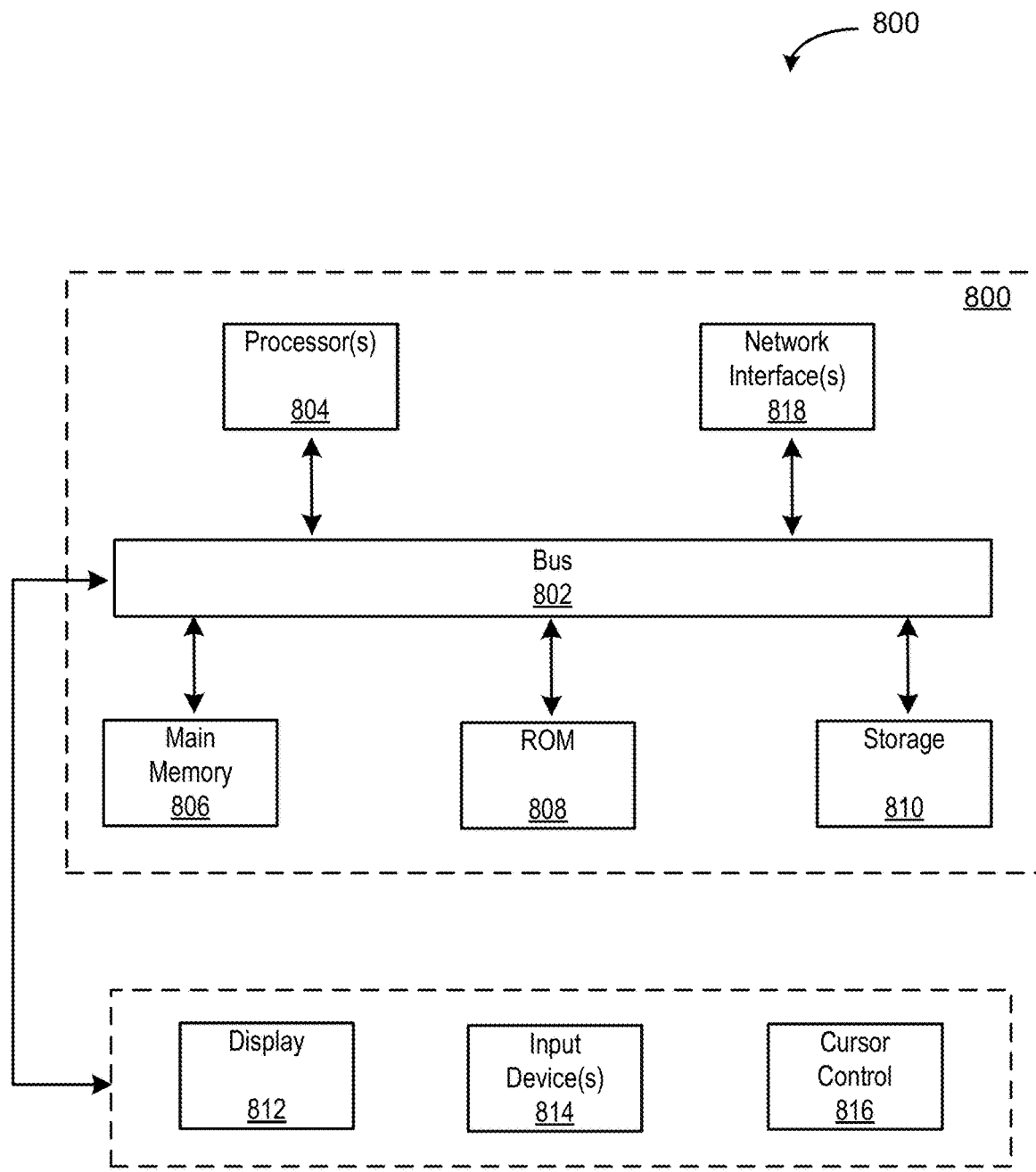
FIG. 8 is an example computing component that may be used to implement various features of embodiments described in the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "engine," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method of a server comprising:
    receiving, from an access point, attributes of an Internet of Things (IoT) device connected to the access point;
    determining a closest matching stored device to the IoT device, in a database of the server, the closest matching stored device sharing a subset of the attributes of the IoT device;
    generating a code bundle based on the subset of the shared attributes between the stored device and the IoT device; and
    determining whether the closest matching stored device differs from the IoT device with regard to at least one of the attributes, wherein in response to determination that the closest matching stored device differs from the IoT device with regard to at least one of the attributes, the code bundle is based on a previously used code bundle corresponding to the closest matching stored device.

2. The computer-implemented method of claim 1, wherein the generation of a code bundle comprises generating:
    a device driver to enumerate the IoT device with an operating system of the access point in order to establish an interface through which the IoT device communicates at the access point;
    port configuration parameters that specify terminal settings of the IoT device, the port configuration parameters comprising a baud rate, a line discipline, an input mode, an output mode, and a termios function setting; and
    a parser function to decipher messages sent by the IoT device.

3. The computer-implemented method of claim 1, wherein the closest matching stored device is determined based on: a number of attributes shared between the closest matching stored device and the IoT device, a decision tree algorithm in which nodes indicate a hierarchy of the attributes, or a k-nearest neighbor algorithm.

4. The computer-implemented method of claim 1, further comprising:
    in response to generation of the code bundle based on the previously used code bundle, validating the generated code bundle, the validation comprising:

transmitting a test message, using the generated code bundle, to the IoT device;

determining whether a reply to the test message was sent to the server from the IoT device;

in response to determining that the IoT device sent a reply to the test message, decoding the reply;

determining that the generated code bundle is validated in response to the decoded reply being complete and of a recognizable format; and in response to the generated code bundle being validated, transmitting the generated code bundle to the access point, the generated code bundle enabling a transmission and reception of data to and from the IoT device at the access point.

5. The computer-implemented method of claim 4, wherein the decoding the reply comprises determination of whether the reply is complete and is of a recognizable format; and the method further comprises:

in response to determining that the reply is incomplete or unrecognizable in format, determining other closest matching stored devices to the IoT device;

iteratively determining whether transmitting a test message using any of previously used code bundles corresponding to the other closest matching stored devices results in a complete reply of a recognizable format from the IoT device; and in response to determining that transmitting a test message using one of the previously used code bundles results in a complete reply having a recognizable format, transmitting the one of the previously used code bundles to the access point.

6. The computer-implemented method of claim 1, wherein the generation of the code bundle comprises:

in response to determining that the closest matching stored device differs from the IoT device with regard to at least one of the attributes, determining whether a device driver and port configuration parameters of the closest matching stored device are compatible with the IoT device; and in response to determining that the device driver and the port configuration parameters of the closest matching stored device are incompatible with the IoT device, iteratively determining whether other device drivers and port configuration parameters are compatible with the IoT device based on other closest matching stored devices to the IoT device until a compatible device driver and compatible port configuration parameters are determined.

7. The computer-implemented method of claim 6, further comprising:

in response to determination that the compatible device driver and the compatible port configuration parameters, logging the attributes of the IoT device and mapping the IoT device with the compatible device driver and the compatible port configuration parameters in the database.

8. The computer-implemented method of claim 2, wherein the generation of the code bundle comprises:

generating the parser function using a supervised machine learning model trained using a training dataset having inputs corresponding to types of problems of parser functions and outputs corresponding to respective code modifications that rectify the types of problems.

9. The computer-implemented method of claim 4, further comprising:

based on the decoded reply, transmitting a message regarding the generated code bundle to an entity associated with the IoT device; and determining whether an indication of an approval is received from the entity; wherein the transmitting the generated code bundle to the access point is in response to determining that an indication of an approval is received.

10. A computing system comprising:

a server comprising a database, the database configured to record stored devices and respective code bundles corresponding to the stored devices;

one or more processors; and a memory storing instructions that, when executed by the one or more processors, causes the one or more processors to:

receive, from an access point, attributes of an Internet of Things (IoT) device connected to the access point;

determine a closest matching stored device to the IoT device, in a database of the server, the closest matching stored device sharing a subset of the attributes of the IoT device;

generate a code bundle based on the subset of the shared attributes between the stored device and the IoT device; and determine whether the closest matching stored device differs from the IoT device with regard to at least one of the attributes, wherein in response to determination that the closest matching stored device differs from the IoT device with regard to at least one of the attributes, the code bundle is based on a previously used code bundle corresponding to the closest matching stored device.

11. The computing system of claim 10, wherein the generated code bundle comprises:

a device driver to enumerate the IoT device with an operating system of an access point to establish an interface through which the IoT device communicates at the access point;

port configuration parameters that specify terminal settings of the IoT device, the port configuration parameters comprising a baud rate, a line discipline, an input mode, an output mode, and a termios function setting; and a parser function to decipher messages sent by the IoT device.

12. The computing system of claim 10, wherein the closest matching stored device is determined based on:

a number of attributes shared between the closest matching stored device and the IoT device, a decision tree algorithm in which nodes indicate a hierarchy of the attributes, or a k-nearest neighbor algorithm.

13. The computing system of claim 10, wherein the instructions further cause the one or more processors to:

in response to generation of the code bundle based on the previously used code bundle, validate the generated code bundle, the validation comprising:

transmit a test message, using the generated code bundle, to the IoT device;

determine whether a reply to the test message was sent to the server from the IoT device;

in response to determining that the IoT device sent a reply to the test message, decode the reply;

determine that the generated code bundle is validated in response to the decoded reply being complete and of a recognizable format; and in response to the generated code bundle being validated, transmit the generated code bundle to the access point, the generated code bundle enabling communications from the IoT device at the access point.

14. The computing system of claim 13, wherein the decoding the reply comprises determining whether the reply is complete; and the instructions further cause the one or more processors to:

in response to determination that the reply is incomplete or unrecognizable in format, determine other closest matching stored devices to the IoT device;

iteratively determine whether transmitting a test message using any of previously used code bundles corresponding to the other closest matching stored devices results in a complete reply of a recognizable format from the IoT device; and in response to determination that transmitting a test message using one of the previously used code bundles results in a complete reply having a recognizable format, transmit the one of the previously used code bundles to the access point.

15. The computing system of claim 10, wherein the generation of the code bundle comprises:

in response to determination that the closest matching stored device differs from the IoT device with regard to at least one of the attributes, determine whether a device driver and port configuration parameters of the closest matching stored device are compatible with the IoT device; and in response to determination that the device driver and the port configuration parameters of the closest matching stored device are incompatible with the IoT device, iteratively determine whether other device drivers and port configuration parameters are compatible with the IoT device based on other closest matching stored devices to the IoT device until a compatible device driver and compatible port configuration parameters are determined.

16. The computing system of claim 11, wherein the generation of the code bundle comprises: generating the parser function using a supervised machine learning model trained using a training dataset having inputs corresponding to types of problems of parser functions and outputs corresponding to respective code modifications that rectify the types of problems.

* * * * *